US011354668B2

(12) United States Patent
Senci et al.

(10) Patent No.: US 11,354,668 B2
(45) Date of Patent: Jun. 7, 2022

(54) SYSTEMS AND METHODS FOR IDENTIFYING DEVICES USED IN FRAUDULENT OR UNAUTHORIZED TRANSACTIONS

(71) Applicant: MASTERCARD INTERNATIONAL INCORPORATED, Purchase, NY (US)

(72) Inventors: David J. Senci, Troy, IL (US); Kyle Williams, Wentzville, MO (US); Michelle L. Hafner, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 37 days.

(21) Appl. No.: 15/804,878

(22) Filed: Nov. 6, 2017

(65) Prior Publication Data
US 2019/0139048 A1  May 9, 2019

(51) Int. Cl.
*G06Q 20/40* (2012.01)
*G06Q 20/32* (2012.01)
*G06Q 20/12* (2012.01)

(52) U.S. Cl.
CPC ......... *G06Q 20/4016* (2013.01); *G06Q 20/12* (2013.01); *G06Q 20/322* (2013.01)

(58) Field of Classification Search
USPC .............................................. 705/39 and, 44
See application file for complete search history.

(56) References Cited

U.S. PATENT DOCUMENTS

| 7,908,645 | B2 | 3/2011 | Varghese et al. |
| 8,739,278 | B2 | 5/2014 | Varghese |
| 9,112,850 | B1* | 8/2015 | Eisen ...................... H04L 63/10 |
| 9,367,844 | B1 | 6/2016 | Hu et al. |
| 10,205,721 | B2* | 2/2019 | Paschini ............. H04L 63/0853 |
| 2007/0084913 | A1 | 4/2007 | Weston |
| 2009/0089869 | A1 | 4/2009 | Varghese |

(Continued)

OTHER PUBLICATIONS

PCT International Search Report and Written Opinion, Application No. PCT/US2018/058173, dated 2019-03-07,10 ops.

*Primary Examiner* — Scott C Anderson
*Assistant Examiner* — Marla Hudson
(74) *Attorney, Agent, or Firm* — Armstrong Teasdale LLP

(57) ABSTRACT

A computer-based method for identifying a user computing device used in a fraudulent transaction is provided. The method includes receiving device data associated with the user computing device during a first payment transaction initiated from the user computing device, wherein the device data is capable of uniquely identifying the user computing device. The method further includes storing the device data within the at least one memory device, and receiving an indication that the first payment transaction initiated from the user computing device was fraudulent. The method further includes assigning a risk factor to the user computing device, and transmitting the risk factor to a merchant, wherein the merchant uses the risk factor to determine whether to process a resale transaction initiated from the user computing device wherein the resale transaction is associated with a resale of goods acquired in association with the first payment transaction.

25 Claims, 7 Drawing Sheets

(56) References Cited

U.S. PATENT DOCUMENTS

| | | | |
|---|---|---|---|
| 2012/0158586 A1* | 6/2012 | Ganti | G06Q 20/405 |
| | | | 705/44 |
| 2014/0101050 A1* | 4/2014 | Clarke | G06Q 20/4016 |
| | | | 705/44 |
| 2015/0348042 A1* | 12/2015 | Jivraj | G06Q 20/4016 |
| | | | 705/44 |
| 2015/0363581 A1 | 12/2015 | Ranadive et al. | |
| 2016/0019546 A1 | 1/2016 | Eisen | |
| 2016/0021084 A1 | 1/2016 | Eisen | |
| 2016/0078436 A1 | 3/2016 | Tomasofsky et al. | |
| 2016/0078443 A1 | 3/2016 | Tomasofsky et al. | |
| 2016/0078444 A1 | 3/2016 | Tomasofsky et al. | |
| 2019/0019179 A1* | 1/2019 | Mtaza | G06Q 20/367 |

\* cited by examiner

SYSTEMS AND METHODS FOR IDENTIFYING DEVICES USED IN FRAUDULENT OR UNAUTHORIZED TRANSACTIONS

BACKGROUND

This disclosure relates generally to identifying computing devices used in fraudulent or unauthorized payment transactions, and more particularly, to systems and methods for identifying computing devices used in fraudulent or unauthorized payment transactions based upon device data collected when devices are used to initiate fraudulent, or potentially fraudulent, payment transactions.

Consumers are often times able to use a variety of methods to perform payment transactions to purchase goods and services. These methods include use of cash, plastic payment cards, digital wallets, smartphones, and other computing devices operated by users (also known as user computing devices) that are able to provide account data and transaction data to complete a purchase. In the case of account data being communicated for the payment transactions, a payment processor computing device typically processes the payment transactions over a processing network. The payment cards and/or user computing devices may be used at point of sale (POS) devices operated by merchants (in what are referred to herein as merchant location transactions), or users may initiate transactions when not at a merchant physical location (e.g., an online transaction initiated from home, such as to order goods from a merchant website). These latter transactions are sometimes also referred to as card-not-present transactions (CNP), because a payment card is not physically presented at a merchant location when the payment transaction is performed.

Where goods are purchased from a merchant website (e.g., as part of a CNP transaction), in some cases, it has been observed that users may attempt to fraudulently obtain such goods using lost or stolen payment cards or lost or stolen account information. These users may, in addition, attempt to resell the fraudulently obtained goods, such as, for example, by way of a third party merchant reseller website, where the goods may be advertised for resale. In addition, to encourage resale, such users may advertise the goods at a reduced price, and once the goods have sold, these users may profit monetarily by the sale.

Systems and methods for preventing, or at least discouraging, fraudulent or unauthorized resale transactions are therefore desirable. More particularly, systems and methods for identifying devices used in the fraudulent or unauthorized acquisition of goods, such as by way of CNP transactions initiated between user devices and merchant websites, are desirable. It is further desirable to provide an indication to a merchant that a particular user device has been flagged or identified as associated with, or potentially associated with, at least one fraudulent transaction, for the purpose of permitting the merchant to refuse subsequent resale transactions initiated from such user devices. Such systems and methods may discourage would-be fraudsters from initiating fraudulent resale transactions in web-based or online sales environments. In addition, such systems and methods may be implemented by merchant resellers of goods to enhance or protect the reputations of such merchant resellers as being trustworthy and offering only legally acquired goods for resale.

BRIEF DESCRIPTION

In one aspect, a computer-based method for identifying user computing devices used in fraudulent transactions is provided. The method is performed using a fraud detection computing device including at least one processor in communication with at least one memory device. The method includes receiving device data associated with the user computing device during a first payment transaction initiated from the user computing device, wherein the device data is capable of uniquely identifying the user computing device. The method further includes storing the device data within the at least one memory device, and receiving an indication that the first payment transaction initiated from the user computing device was fraudulent. The method further includes assigning a risk factor to the user computing device, and transmitting the risk factor to a merchant, wherein the merchant uses the risk factor to determine whether to process a resale transaction initiated from the user computing device.

In another aspect, a fraud detection computing device including at least one processor in communication with at least one memory device is provided. The fraud detection computing device is configured to receive device data associated with the user computing device during a first payment transaction initiated from the user computing device, wherein the device data is capable of uniquely identifying the user computing device. The fraud detection computing device is further configured to store the device data within the at least one memory device, and receive an indication that the first payment transaction initiated from the user computing device was fraudulent. The fraud detection computing device is further configured to assign a risk factor to the user computing device, and transmit the risk factor to a merchant, wherein the merchant uses the risk factor to determine whether to process a resale transaction initiated from the user computing device.

In a further aspect, a non-transitory computer readable medium that includes executable instructions for identifying user computing devices used in fraudulent transactions is provided. When executed by a fraud detection computing device including at least one processor in communication with at least one memory device, the computer executable instructions cause the fraud detection computing device to receive device data associated with the user computing device during a first payment transaction initiated from the user computing device, wherein the device data is capable of uniquely identifying the user computing device. The computer executable instructions further cause the fraud detection computing device to store the device data within the at least one memory device, and receive an indication that the first payment transaction initiated from the user computing device was fraudulent. The computer executable instructions further cause the fraud detection computing device to assign a risk factor to the user computing device, and transmit the risk factor to a merchant, wherein the merchant uses the risk factor to determine whether to process a resale transaction initiated from the user computing device.

BRIEF DESCRIPTION OF THE DRAWINGS

FIG. 1 is a schematic diagram illustrating an example fraud detection platform for identifying user computing devices used in fraudulent or unauthorized payment transactions.

FIG. 2 is a block diagram of the fraud detection platform shown in FIG. 1 including multiple example computing devices communicatively coupled to each other via a plurality of network connections.

FIG. 3 illustrates an example expanded configuration of the fraud detection platform shown in FIG. 2.

FIG. 4 illustrates an example configuration of a user system, such as user computing device configured to transmit data to the fraud detection computing device shown in FIG. 2.

FIG. 5 shows an example configuration of a server system, such as the fraud detection computing device shown in FIG. 2.

FIG. 6 shows an example method flow illustrating how the fraud detection computing device of FIG. 2 identifies user computing devices used in fraudulent or unauthorized payment transactions.

FIG. 7 shows an example configuration of a database within the fraud detection computing device shown in FIG. 2 that collects device data.

Like numbers in the figures indicate the same or functionally similar components.

DETAILED DESCRIPTION

Figure 1:
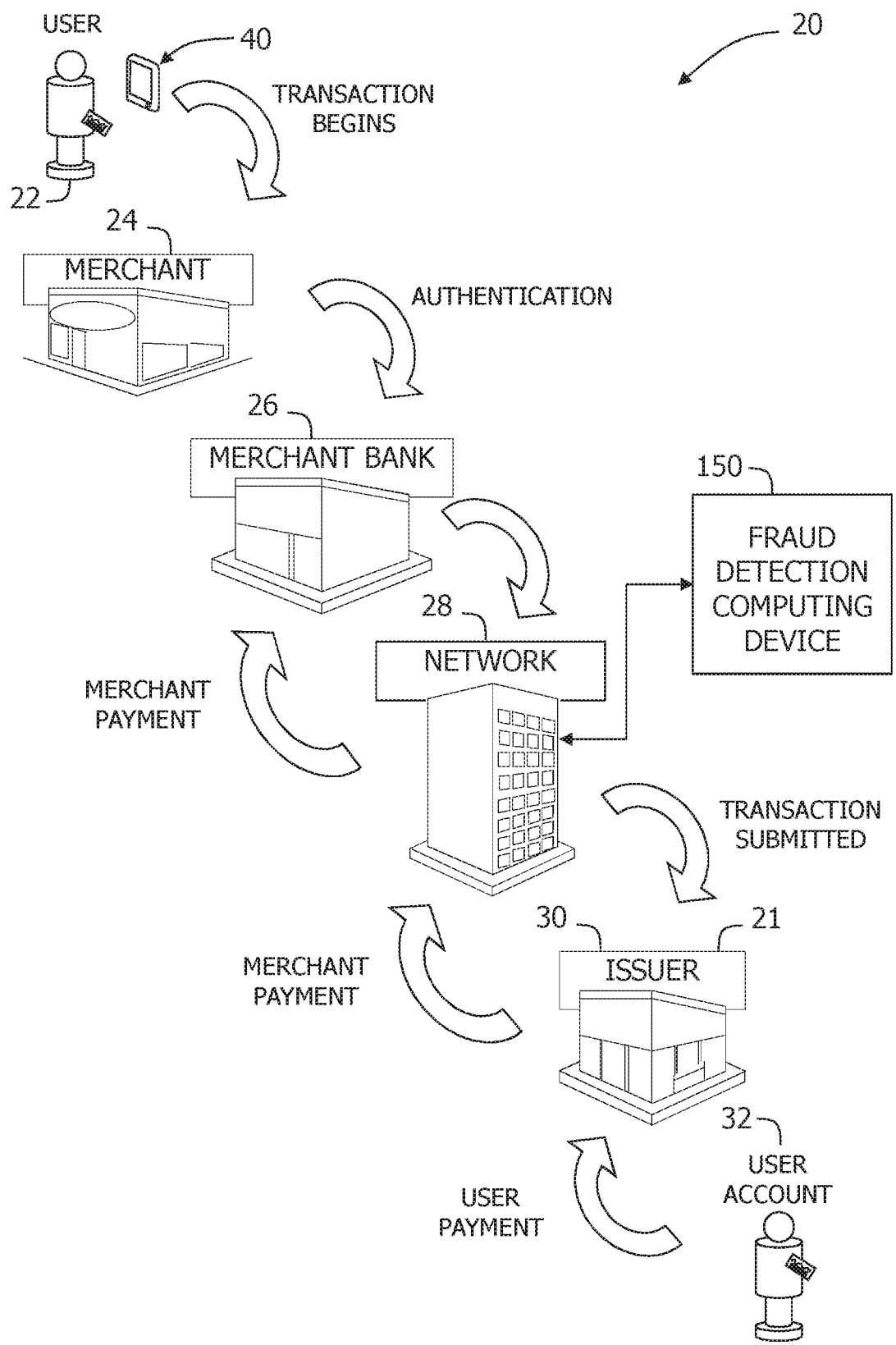
FIGS. 1-7 show example embodiments of the methods and systems described herein.

The present disclosure relates to a fraud detection computing device that identifies a user computing device used in a fraudulent or unauthorized payment transaction, as described herein. In the example embodiment, the fraud detection computing device receives device data associated with a user computing device, such as, for example, any device data that is capable of, or that may be used to, uniquely identify the user computing device. The fraud detection computing device may also receive transaction data, such as any data associated with a purchase or purchasing activity initiated from the user computing device, as described herein. For brevity, and as used herein, device data may include data that may be used to uniquely identify a user computing device, such as device metadata, as well as various transaction or payment data.

More particularly, in the example embodiment, device data may be acquired by the merchant computing device as part of a first payment transaction (which may include a first request for authorization, as described above) and passed by the merchant computing device to the fraud detection computing device. As the merchant computing device processes the first payment transaction, including payment information, in cooperation with the payment network, the merchant computing device may provide the user's payment information and/or any other transaction data to the fraud detection computing device.

In addition, the merchant computing device may acquire, as part of the request for authorization received in conjunction with the first payment transaction, various device data, such as device metadata, associated with the user computing device. As described herein, the device data may be any data that is capable of being used to uniquely identify the user computing device, such as one or more device identifiers, one or more IP addresses, and the like.

Thus, at a high level, device data may include device metadata and/or at least some transaction data. However, in some embodiments, device data includes device metadata, but may not include transaction data. Rather, transaction data may be considered a separate data set for purposes of this disclosure. More particularly, device data may include any of the following: a unique device identifier associated with the user computing device, such as a MAC address, an IP address associated with the user computing device, and IP prefix associated with the user computing device, an event type associated with a transaction, a client name associated with a transaction, a transaction amount associated with a transaction, a transaction currency code associated with a transaction, a transaction date associated with a transaction, a transaction time associated with a transaction, a HTTP header associated with a transaction, an email address associated with a transaction, a shipping address associated with a transaction, a shipping city associated with a transaction, a shipping state associated with a transaction, a shipping country associated with a transaction, a shipping postal code associated with a transaction, a billing address associated with a transaction, a billing city associated with a transaction, a billing state associated with a transaction, a billing country associated with a transaction, a billing postal code associated with a transaction, a user account identifier associated with a transaction, a telephone number associated with a transaction, a telephone country associated with a transaction, a telephone area code associated with a transaction, a primary account number (PAN) associated with a transaction, a PAN expiration date associated with a transaction, a login authentication method associated with a transaction, a card verification status associated with a transaction, a notification outcome associated with a transaction, a merchant identifier associated with a transaction, an acquirer identifier, a stock keeping unit (SKU) category associated with a transaction, an application message type associated with a transaction, a wallet distributor associated with a transaction, and/or a wallet issuer associated with a transaction.

Having obtained various device data, fraud detection computing device 150 may store the various device data within at least one memory device, such as, for example, within a database. The device data may be stored in a database structure, such as within a relational database structure, and associated, in some embodiments, with the payment card number of account number as the primary key. Further, the device data may be stored in any suitable manner and/or in association with any primary key, such as, for example, a device identifier associated with and/or assigned to the user computing device.

In the normal course of business, the first payment transaction may be processed by the payment network and completed without any indication of fraudulent or unauthorized activity. However, as described herein, in some cases, a user may initiate the transaction using a lost or stolen payment card and/or lost or stolen payment account or transaction account details. To detect or identify such fraudulent activity, the fraud detection computing device may initially receive an indication, such as from a rightful owner of the payment card or payment account, that the transaction was not authorized or initiated by the owner of the payment account. In other words, the fraud detection computing device may receive an indication from the owner of the payment account (e.g., in response to the appearance of the transaction record on an account statement provided to the owner) that the first payment transaction was made fraudulently and/or without the knowledge and/or permission of the account owner.

In response to such an indication by an owner of a payment account, the fraud detection computing device may analyze the device data collected and stored in conjunction with the first payment transaction to flag or otherwise designate the device data as associated with a fraudulent transaction and/or as associated with a user computing device that may be in the possession of a user who is using the device to initiate fraudulent transactions. More particularly, where the device data is capable of being used to uniquely identify the user computing device used by the user responsible for the fraudulent transaction, the fraud detection computing device may flag or otherwise designate the user computing device as associated with, or potentially associated with, fraudulent activity. For example, in some embodiments, the fraud detection computing device may assign a risk factor, such as a numerical score, to the user computing device (and/or the device data associated with the user computing device), where the risk factor may be indicative of a likelihood or probability that the user computing device has been or is being used to initiate one or more fraudulent or otherwise unauthorized transactions.

In addition, in the example embodiment, the fraud detection computing device may transmit the flag associated with the user computing device and/or some other indication, such as a message or an alert indicating that the user computing device has been or may be associated with fraudulent purchasing activity, to one or more merchant computing devices, such as a merchant computing devices associated with merchant resellers of goods, such as EBAY, CRAIGSLIST, and/or any other merchant resellers of goods. In some embodiments, such as where a risk factor is assigned to the user computing device, the fraud detection computing device may transmit the risk factor to one or more merchant computing devices. The flag, risk factor, or alert may, in various embodiments, be provided to one or more merchant computing devices in response to a request by the merchant computing devices for the flag, risk factor, or alert. Similarly, in some embodiments, the flag, risk factor, or alert may simply be pushed or provided by the fraud detection computing device to the merchant computing devices absent any request by the merchant computing devices, such as, for example, on a periodic (e.g., real-time, hourly, daily, weekly, etc.) basis.

The merchant computing devices may receive the indication, message, or alert indicating that the user computing device has been or may be associated with fraudulent purchasing activity and/or, where applicable, the risk factor, and, based upon the indication and/or risk factor, the merchant computing devices may determine whether to process a resale transaction received from or initiated by the user computing device. As described in greater detail below, such a resale transaction may include an attempt or request to resell goods obtained during the first payment transaction (and/or during any other transaction) via the merchant reseller's website.

For example, a particular merchant computing device may receive a request from the user computing device to post or advertise goods for sale via a website associated with the merchant computing device. For simplicity, such a request may be referred to herein as a "resale transaction." In response to the resale transaction, the merchant computing device may, as described above, utilize device data associated with the user computing device to uniquely identify the user computing device. Having identified the user computing device, the merchant computing device may communicate with the database to retrieve any flag, risk factor, or alert stored in the database for the user computing device. If a flag, risk factor, or alert is stored in association with the user computing device, the merchant computing device may refuse or deny the resale transaction and/or, in some embodiments, the merchant computing device may analyze or evaluate the risk factor, which may include a risk score, associated with the user computing device to determine whether to refuse or deny the resale transaction.

For example, if the risk score stored in association with the user computing device is greater than a threshold value, the merchant computing device may refuse or deny the resale transaction, such that the user is not allowed to offer or advertise the goods for sale. On the other hand, if the risk score stored in association with the user computing device is less than a threshold value, the merchant computing device may process the resale transaction, such that the user is allowed to offer or advertise goods for sale in association with the resale transaction.

Thus, the merchant computing device may determine that a particular user computing device is, or may be, associated with fraudulent or unauthorized purchasing activity. In response to such a determination, the merchant computing device may prevent the user from advertising goods for sale via the merchant reseller's website, including, in some cases, the goods purchased in connection with the first payment transaction (e.g., where the merchant computing device receives an indication that the user computing device is associated with potentially fraudulent activity prior to an attempt at resale of the goods). In other embodiments, the merchant computing device may restrict or prevent login to an account, such as an account provided by the merchant reseller. Further still, in some embodiments, the merchant computing device may prevent account registration and/or provide the device data associated with the user computing device to law enforcement and/or any other system or party for further investigation.

In addition, in the example embodiment, the fraud detection computing device may update a risk score associated with the user computing device based upon a plurality of transactions initiated from the user computing device. More particularly, the fraud detection computing device may increase a risk score associated with the user computing device in response to a plurality of indications of fraudulent or unauthorized purchasing activity initiated from the user computing device. On the other hand, however, the fraud detection computing device may decrease a risk score associated with the user computing device in response to an indication that a transaction initiated from the user computing device was authorized or not fraudulent. Further, in some embodiments, the fraud detection computing device may decrease a risk score after a period of time has elapsed, provided no indication of fraud or unauthorized purchasing activity is received in connection with the user computing device.

The technical problems addressed by the fraud detection computing platform include at least one of: (i) inability to specifically identify user computing devices used to initiate fraudulent payment transactions; (ii) inability of being able to identify user computing devices attempting to resell goods that have been illegally or fraudulently obtained; (iii) inability to electronically alert parties about user computing devices used in fraudulently obtaining goods; (iv) inability to electronically alert parties associated with reselling websites about user computing devices used to fraudulently obtain goods that might be resold on such websites; (v) inability to electronically receive a message or a request for information from a merchant reseller and electronically respond in real-time with a risk score indicating whether a device attempting to resell a good on such a website is likely associated with a fraudster; and (vi) inability to provide a notification related to resale activity associated with a fraudulent computing device.

The methods and systems described herein may be implemented using computer programming or engineering techniques including computer software, firmware, hardware, or any combination or subset thereof, wherein the technical effects may be achieved by (i) receiving device data associated with the user computing device during a first payment transaction initiated from the user computing device, wherein the device data is capable of uniquely identifying the user computing device, (ii) storing the device data within the at least one memory device, (iii) receiving an indication that the first payment transaction initiated from the device was fraudulent, (iv) assigning a risk factor to the user computing device, and (v) transmitting the risk factor to a merchant, wherein the merchant uses the risk factor to determine whether to process a resale transaction, such as a transaction associated with a resale of fraudulently obtained goods, initiated from the device.

The resulting technical benefits achieved by the fraud detection computing platform include at least one of: (i) identifying, based upon device data, user devices used in fraudulent transactions, such as user devices used to initiate fraudulent or unauthorized purchases by way of a merchant website; (ii) assigning a flag or a risk score to such user devices; (iii) providing an indication, such as the flag, risk score, and/or alert, that such devices are associated with fraudulent or unauthorized purchasing activity to one or more merchant computing devices, such that the one or more merchant computing devices are able to deny subsequent transactions, such as transactions associated with the resale of goods, initiated from such devices.

Thus, the fraud detection computing platform offers a unique solution to the internet-centric problem of identifying user devices used in fraudulent transactions and alerting merchants to the presence of such devices on the internet. Various technical benefits are described above, such as benefits which may be realized by merchant computing devices that process purchasing activity on the internet. For example, although many existing internet-based merchant sales systems are susceptible to repeated fraudulent purchasing activity by a particular user device, with the disclosed systems and methods, existing internet-based merchant sales systems are able to deny many potentially fraudulent (or fraudulent) transactions which might otherwise be authorized and processed to the detriment of the merchant and/or customer.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example fraud detection platform 20 for identifying devices used in fraudulent and/or unauthorized transactions, such as, for example, devices used in the fraudulent or unauthorized acquisition of goods. Embodiments described herein may relate to a transaction card system, such as a payment card payment system using the Mastercard interchange network. The Mastercard interchange network is a set of proprietary communications standards promulgated by Mastercard International Incorporated for the exchange of financial transaction data and the settlement of funds between financial institutions that are members of Mastercard International Incorporated. (Mastercard is a registered trademark of Mastercard International Incorporated located in Purchase, N.Y.). Embodiments described herein also relate to a fraud detection computing device 150 that is communicatively coupled to an interchange network 28. Fraud detection computing device 150 is configured to identify devices used in fraudulent transactions, such as, for example, devices used in the fraudulent acquisition of goods, as described herein.

In the example fraud detection platform 20, a financial institution called the "issuer" or "issuing bank" issues an account, such as a credit card account, to the user 22, who uses the account to tender payment for a purchase from a merchant 24. In one embodiment, the user presents a digital wallet to merchant 24 (also known as a card-present transaction) using a user computing device. In another embodiment, the user does not present a digital wallet and instead performs a card-not-present transaction. For example, the card-not-present transaction may be initiated via a digital wallet application, through a website or web portal, via telephone, or any other method that does not require the user to present a physical payment card to merchant 24 (e.g., via scanning the digital wallet).

To accept payment with the payment card, merchant 24 establishes an account with a financial institution that is part of the financial payment system. This financial institution is usually called the "merchant bank," the "acquiring bank," or the "acquirer." In one embodiment, user 22 tenders payment for a purchase using a transaction card at a transaction processing device 40 (e.g., a point of sale device and/or a merchant website hosted by merchant 24), then merchant 24 requests authorization from a merchant bank 26 for the amount of the purchase. The request is usually performed through the use of a point-of-sale terminal and/or merchant website, which reads user 22's account information from a magnetic stripe, a chip, barcode, or embossed characters on the transaction card (e.g., a digital wallet) and/or receives account information via a network, such as the internet, and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether user 22's account 32 is in good standing and whether the purchase is covered by user 22's available credit line. Based on these determinations, the request for authorization will be declined or accepted. If the request is accepted, an authorization code is issued to merchant 24.

When a request for authorization is accepted, the available credit line of user 22's account 32 is decreased. Normally, a charge for a payment card transaction is not posted immediately to user 22's account 32 because certain rules do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If user 22 cancels a transaction before it is captured, a "void" is generated. If user 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional digital wallet transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, user account information, a type of transaction, information regarding the purchased item and/or service, and/or other suitable information, is associated with a transaction and transmitted between parties to the transaction as digital wallet transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, user 22, merchant 24, merchant bank 26, interchange network 28 (also referred to herein as payment processor 28), issuer bank 30, and/or an issuer processor 21.

Figure 2:
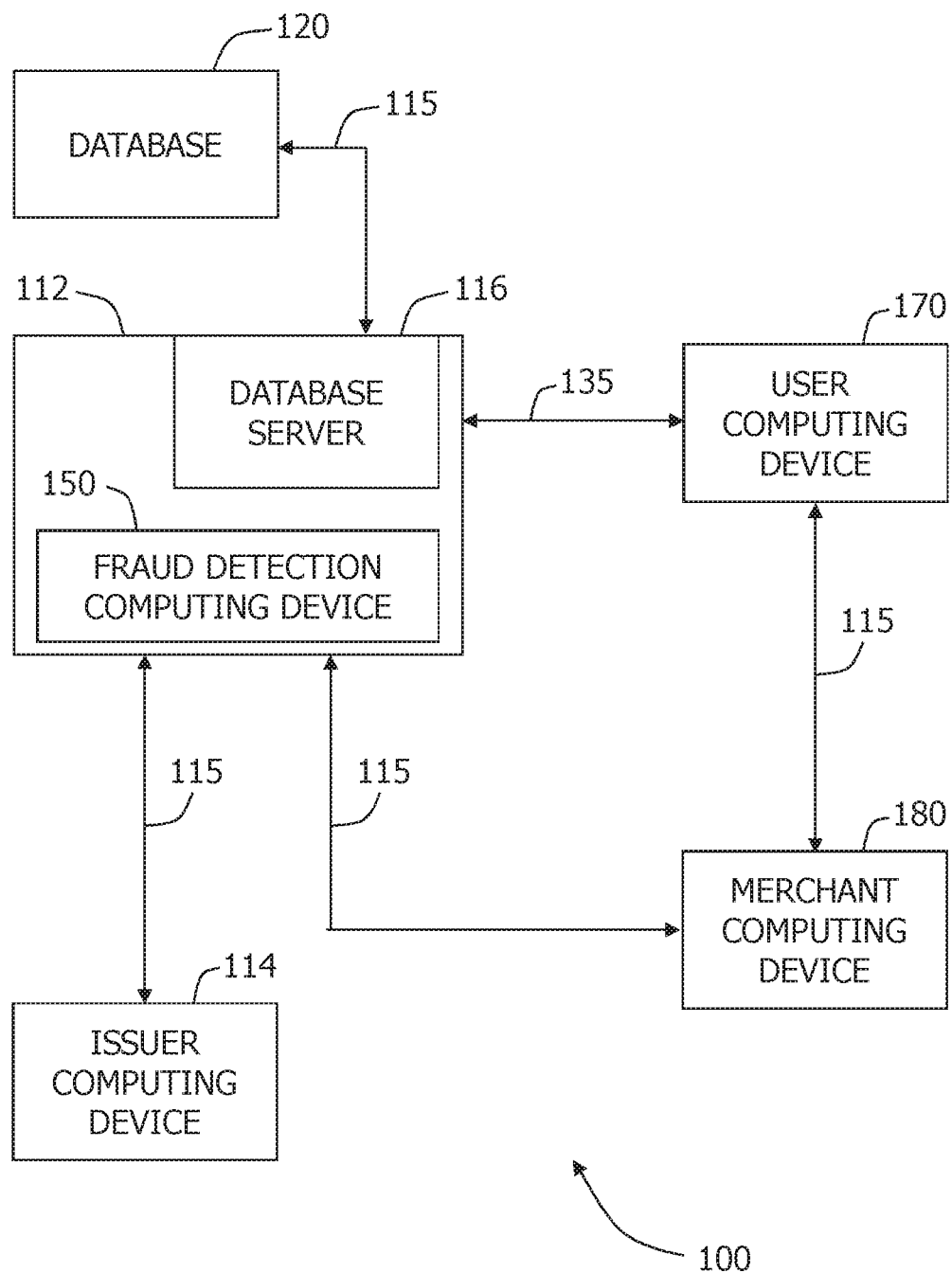

FIG. 2 is a block diagram of an example fraud detection computing platform 100, in which a variety of computing devices are communicatively coupled to each other via a plurality of network connections. These network connections may be Internet, LAN/WAN (Local Area Network/Wide Area Network), or other connections capable of transmitting data across computing devices. Fraud detection computing platform 100 includes fraud detection computing device 150 and a database server 116. In one embodiment, fraud detection computing device 150 and database server 116 are components of server system 112. Server system 112 may be a server, a network of multiple computer devices, a virtual computing device, or the like. Fraud detection computing device 150 is connected to at least one user computing device 170, a merchant computing device 180, and an issuer computing device 114 via at least a network connection 115.

In one embodiment, fraud detection computing device 150 is configured to receive digital wallet transaction data from merchant computing device 180, over a network connection 115. Fraud detection computing device 150 may be operated by and/or affiliated with interchange network 28. Alternatively, fraud detection computing device 150 may be operated by and/or affiliated with any entity that enables fraud detection computing device to function as described herein.

As noted with respect to FIG. 1, when a user performs a payment transaction at a merchant location and/or via a merchant website, digital wallet transaction data may be generated. Digital wallet transaction data may be transmitted across computer devices as a digital wallet transaction data message. In one embodiment, when a user performs a transaction at merchant computing device 180 associated with a merchant, such as a merchant reseller of goods, digital wallet transaction data for the transaction is transmitted to server system 112. Server system 112 processes the digital wallet transaction data in the manner described with respect to FIG. 1 and also provides it to fraud detection computing device 150. Fraud detection computing device 150 may also be configured to communicate with user computing device 170 via an electronic communication channel or method that is distinct from one used to communicate digital wallet transaction data. In the example embodiment, fraud detection computing device 150 is configured to communicate with user computing device 170 via electronic communication channel 135.

The digital wallet transaction data message may also include a transaction amount or payment amount, a transaction date or payment date, account data related to the payment card used to perform the transaction (e.g., primary account number associated with payment card, card expiration date, card issuer, card security code, or the like), a merchant identifier, stock-keeping unit (SKU) data relating to the goods or services purchased from the user, or the like.

Database server 116 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized. Database 120 may include a single database having separated sections or partitions or may include multiple databases, each being separate from each other. Database 120 may store demographic data for each user in communication with fraud detection computing device 150.

In the example embodiment, fraud detection computing device 150 includes specifically designed computer hardware to perform the steps described herein, and includes specifically designed computer implementation instructions. Fraud detection computing device 150 is a specially designed and customized computer device built to perform the specific functions of identifying device, such as user devise, used in fraudulent transactions, as described herein.

Figure 3:
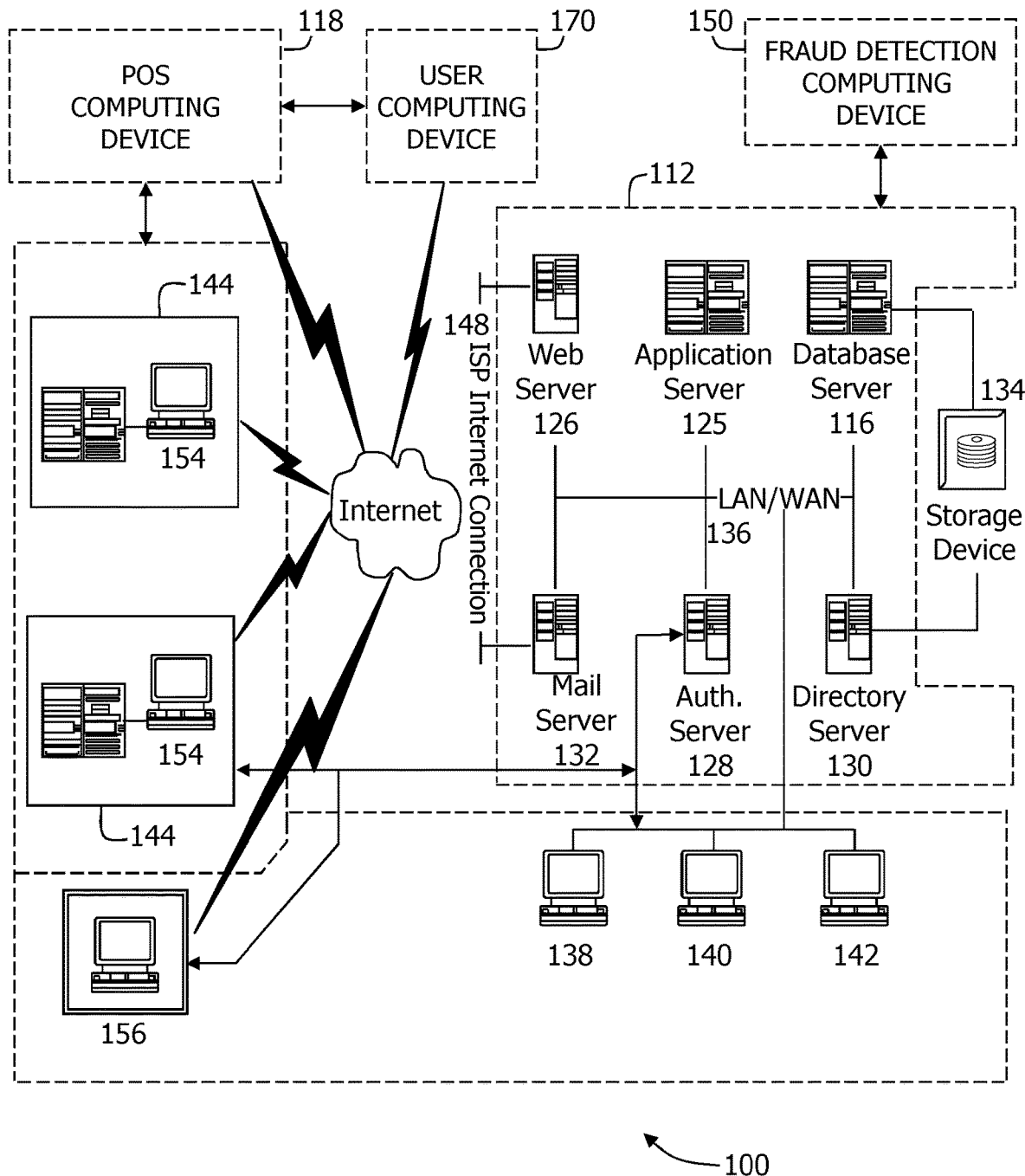

FIG. 3 is an expanded block diagram of an example embodiment of server architecture of a fraud detection computer platform 100 including other computer devices in accordance with one embodiment of the present disclosure. Components in fraud detection computer platform 100 are identified in FIG. 3 using the same reference numerals as used in FIG. 2. Fraud detection computer platform 100 includes server system 112. Server system 112 further includes database server 116, an application server 125, a web server 126, an authentication server 128, a directory server 130, and a mail server 132. A storage device 134 is coupled to database server 116 and directory server 130. Servers 116, 125, 126, 128, 130, and 132 are coupled in a network connection, such as LAN/WAN 136. In addition, an issuer bank workstation 138 (similar to issuer computing device 114 shown in FIG. 2), acquirer bank workstation 140, and a third party processor workstation 142 may be coupled to LAN/WAN 136.

In the example embodiment, issuer bank workstation 138, acquirer bank workstation 140, and third party processor workstation 142 are coupled to LAN/WAN 136 using network connection 115 (shown in FIG. 2). Workstations 138, 140, and 142 are coupled to LAN/WAN 136 using an Internet link or are connected through an Intranet. In the example embodiment, fraud detection computing device 150 is in communication with issuer bank workstation 138 and POS computing device 118 (which may be, for example, the same as merchant computing device 180 (as shown in FIG. 2)). User computer device 170 is connected to the Internet and may be a smartphone, personal computer, tablet computer, desktop, laptop, or similar computing device. Fraud detection computing device 150 is configured to receive digital wallet transaction data, from POS computing device 118 and user computing device 170 via server system 112.

Each workstation 138, 140, and 142 is a computer with Internet access. Although the functions performed at the workstations typically are illustrated as being performed at respective workstations 138, 140, and 142, such functions can be performed at one of many personal computers coupled to LAN/WAN 136. Workstations 138, 140, and 142 are illustrated as being associated with separate functions only to facilitate an understanding of the different types of functions that can be performed by individuals having access to LAN/WAN 136.

Server system 112 is configured to be communicatively coupled to various individuals, including employees and third parties 144 (e.g., auditors, developers, merchants, acquirers, issuers, etc.), using an ISP Internet connection 148. The communication in the example embodiment is illustrated as being performed using the Internet. However, any other wide area network (WAN) type communication can be utilized in other embodiments. In other words, the systems and processes are not limited to being practiced using the Internet.

In the example embodiment, any authorized individual having a workstation 154 can access fraud detection computer platform 100. At least one of the client systems includes a manager workstation 156 located at a remote location. Workstations 154 and 156 are personal computers having a web browser. Also, workstations 154 and 156 are configured to communicate with server system 112. Furthermore, authentication server 128 communicates with remotely located client systems, including a client system 156 using a telephone link. Authentication server 128 is configured to communicate with other client workstations 138, 140, and 142 as well.

Figure 4:
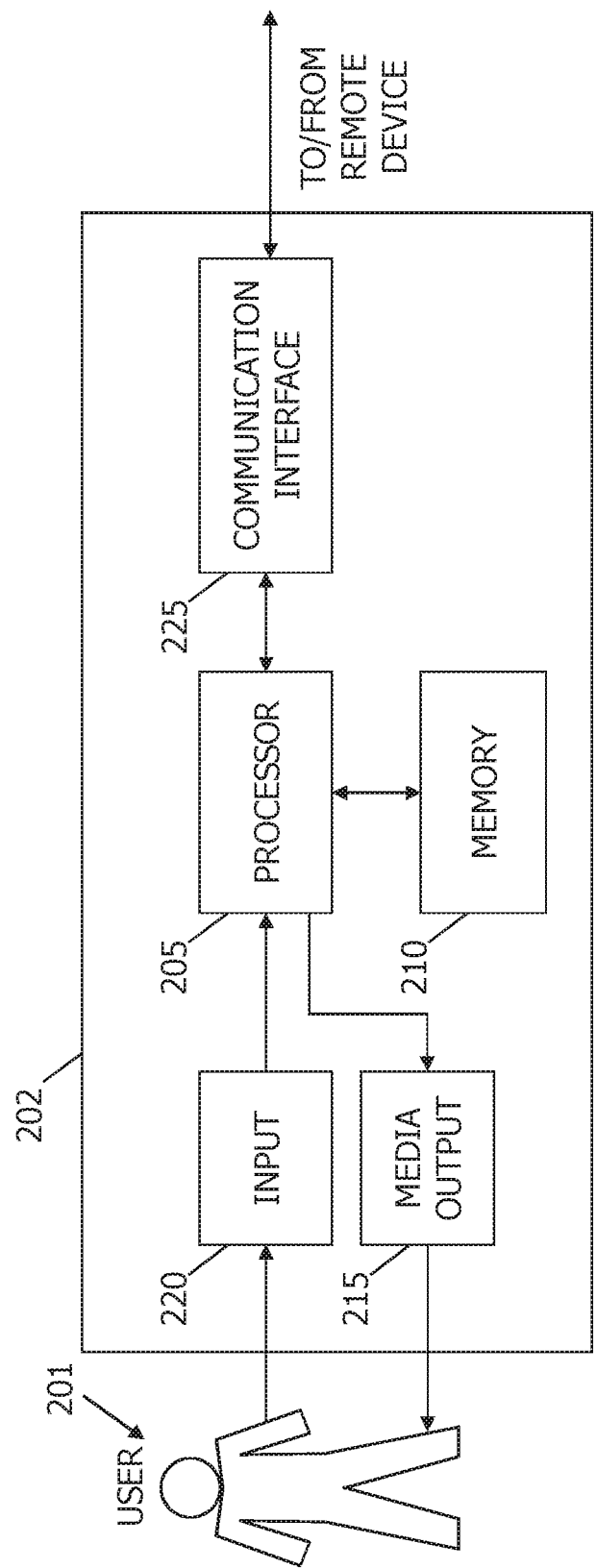

FIG. 4 illustrates an example configuration of a user system, such as a user computing device configured to transmit data to fraud detection computing device 150. User system 202 may include, but is not limited to, user computing device 170 (shown in FIG. 2). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as server system 112 (shown in FIG. 2). Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
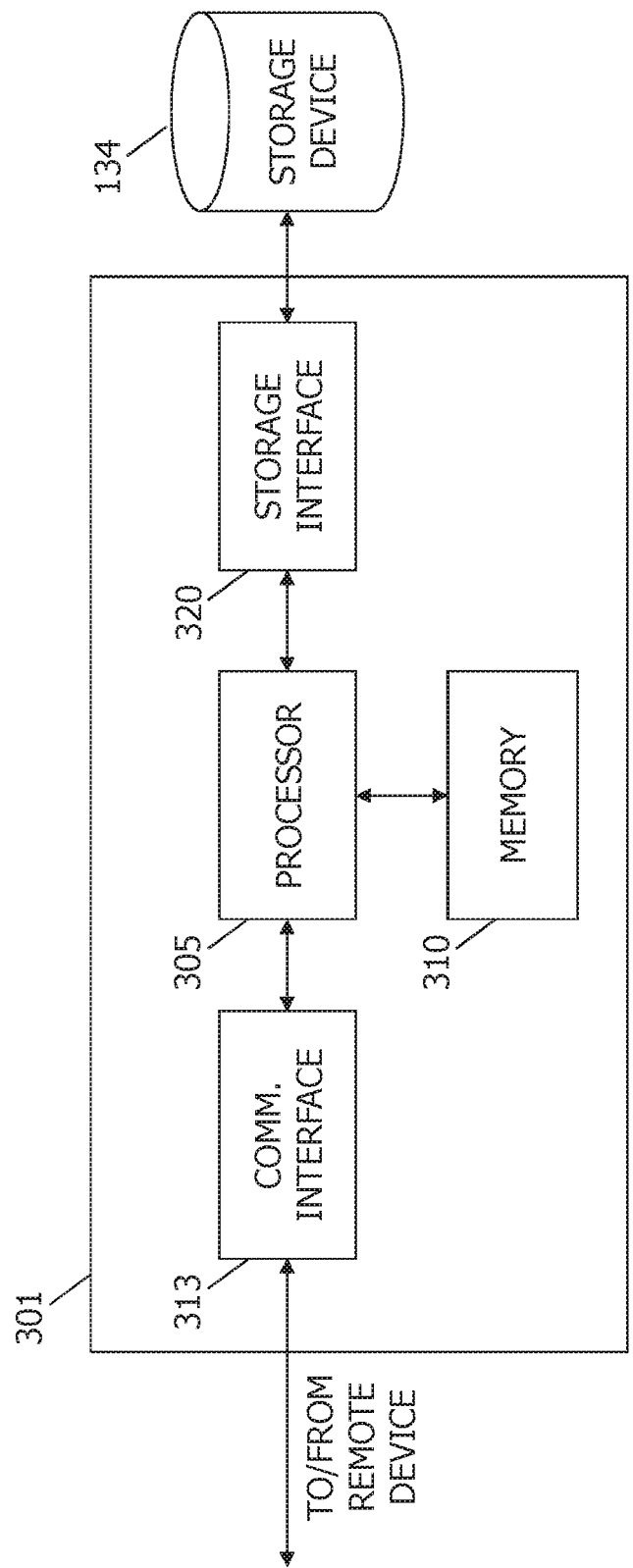

FIG. 5 illustrates an example configuration of a server system 301 such as the server system 112 shown in FIG. 2 that includes fraud detection computing device 150 (shown in FIG. 2). Server system 301 may include, but is not limited to, database server 116 (shown in FIG. 2) or fraud detection computing device 150 (shown in FIG. 2). In some embodiments, server system 301 is similar to server system 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 313 such that server system 301 is capable of communicating with a remote device such as a user system or another server system 301. For example, communication interface 313 may receive communications from issuer computing devices 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
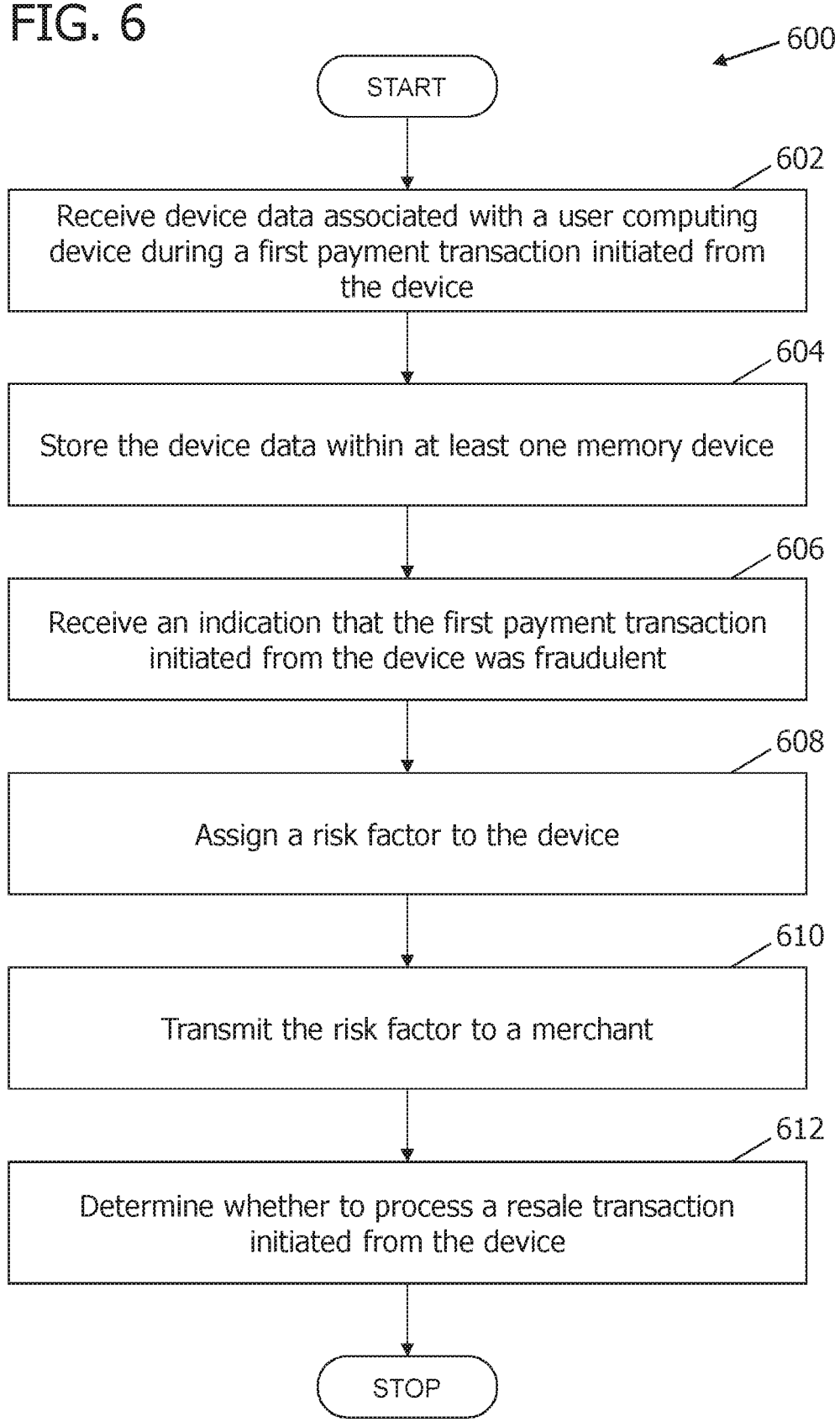

FIG. 6 is an example flow diagram illustrating a method flow 600 by which fraud detection computing device 150 (shown in FIG. 2) identifies a user device used in a fraudulent transaction, as described herein. In the example embodiment, fraud detection computing device 150 receives device data associated with user computing device 170, such as, for example, any device data, such as device metadata, that is capable of, or that may be used to, uniquely identify user computing device 170 (step 602). Fraud detection computing device may also receive transaction data, such as any data associated with a purchase or purchasing activity initiated from user computing device 170, as described herein. As stated above, for brevity, and as used herein, device metadata and/or transaction data may collectively be referred to herein simply as "device data." However, in some embodiments, device data and transaction data may be considered separate data sets.

More particularly, in the example embodiment, device data may be acquired by merchant computing device 180 as part of a first payment transaction (which may include a first request for authorization, as described above) and passed by merchant computing device 180 to fraud detection computing device 150. As described herein, merchant computing device 180 may be associated with a merchant reseller and/or a merchant reseller website. However, in other embodiments, merchant computing device 180 may be associated with any merchant that offers goods for sale. Accordingly, as merchant computing device 180 processes the first payment transaction, including payment information, in cooperation with the payment network, merchant computing device 180 may provide the user's payment information and/or any other transaction data to fraud detection computing device 150.

In addition, merchant computing device 180 may acquire, as part of the request for authorization received in conjunction with the first payment transaction, various device data associated with user computing device 170. As described herein, the device data may be any data that is capable of being used to uniquely identify user computing device 170, such as one or more device identifiers, one or more IP addresses, and the like.

Thus, at a high level, device data may include device metadata and/or transaction data. However, in some embodiments, device data and transaction data may be considered separate data sets. More particularly, device data may include any of the following: a unique device identifier associated with user computing device 170, such as a MAC address, an IP address associated with user computing device 170, and IP prefix associated with user computing device 170, an event type associated with a transaction, a client name associated with a transaction, a transaction amount associated with a transaction, a transaction currency code associated with a transaction, a transaction date associated with a transaction, a transaction time associated with a transaction, a HTTP header associated with a transaction, an email address associated with a transaction, a shipping address associated with a transaction, a shipping city associated with a transaction, a shipping state associated with a transaction, a shipping country associated with a transaction, a shipping postal code associated with a transaction, a billing address associated with a transaction, a billing city associated with a transaction, a billing state associated with a transaction, a billing country associated with a transaction, a billing postal code associated with a transaction, a user account identifier associated with a transaction, a telephone number associated with a transaction, a telephone country associated with a transaction, a telephone area code associated with a transaction, a primary account number (PAN) associated with a transaction, a PAN expiration date associated with a transaction, a login authentication method associated with a transaction, a card verification status associated with a transaction, a notification outcome associated with a transaction, a merchant identifier associated with a transaction, an acquirer identifier, a stock keeping unit (SKU) category associated with a transaction, an application message type associated with a transaction, a wallet distributor associated with a transaction, and/or a wallet issuer associated with a transaction.

Having obtained various device data, such as device metadata, and/or transaction data, fraud detection computing device 150 may store the various device data within at least one memory device, such as, for example, within database 120 (step 604). The metadata may be stored in a database structure, such as within a relational database structure, and associated, in some embodiments, with the payment card number of account number as the primary key. Further, the device data may be stored in any suitable manner and/or in association with any primary key, such as, for example, a device identifier associated with and/or assigned to user computing device 170.

In the normal course of business, the first payment transaction may be processed by the payment network and completed without any indication of fraud and/or unauthorized purchasing activity. However, as described herein, in some cases, a user may initiate the first payment transaction using a lost or stolen payment card and/or lost or stolen payment account or transaction account details. To detect or identify such fraudulent activity, fraud detection computing device 150 may initially receive an indication, such as from a rightful owner of the payment card or payment account, that the first payment transaction was not authorized or initiated by the owner of the transaction account (step 606). In other words, fraud detection computing device 150 may receive an indication from the owner of the payment account (e.g., in response to the appearance of the transaction on an account statement provided to the owner) that the first payment transaction was made fraudulently and/or without the knowledge and/or permission of the account owner.

In response to such an indication by an owner of a transaction account, fraud detection computing device 150 may analyze the device data collected and stored in conjunction with the first payment transaction to flag or otherwise designate the device data as associated with a fraudulent transaction and/or as associated with a device that may be in the possession of a user who is using the device to initiate fraudulent transactions. More particularly, where the device data is capable of being used to uniquely identify the device (e.g., user computing device 170) used by the user responsible for the fraudulent transaction, fraud detection computing device 150 may flag or otherwise designate user computing device 170 as associated with, or potentially associated with, fraudulent activity. For example, in some embodiments, fraud detection computing device 150 may assign a risk factor, which may include a risk score, such as a numerical score, to user computing device 170 (and/or the device data associated with user computing device 170), where the risk factor may be indicative of a likelihood or probability that user computing device 170 has been or is being used to initiate one or more fraudulent transactions (step 608).

In addition, in the example embodiment, fraud detection computing device 150 may transmit the flag associated with user computing device 170 and/or some other indication, such as a message or alert indicating that user computing device 170 has been or may be associated with fraudulent purchasing activity, to one or more merchant computing devices, such as merchant computing device 180. Such merchant computing devices may be associated with one or more merchant resellers of goods, such as EBAY, CRAIGSLIST, and/or any other merchant resellers of goods. In some embodiments, such as where a risk factor is assigned to user computing device 170, fraud detection computing device 150 may transmit the risk factor to one or more merchant computing devices, including, for example, merchant computing device 180 (step 610). The flag, risk factor, or alert may, in various embodiments, be provided to the merchant computing devices, including merchant computing device 180, in response to a request by one or more of the merchant computing devices, such as by merchant computing device 180, for the flag, risk factor, or alert. Similarly, in some embodiments, the flag, risk factor, or alert may simply be pushed or provided by fraud detection computing device 150 to one or more merchant computing devices, such as merchant computing device 180, absent any request by the plurality of merchant computing devices, including merchant computing device 180, such as, for example, on a periodic (e.g., real-time, hourly, daily, weekly, etc.) basis. Thus, the flag, risk factor, or alert may be provided to a plurality of merchant computing devices. Such merchant computing devices may, as described herein, include merchant computing devices associated with or operated by various merchant resellers of goods. For simplicity, however, the remaining description is provided with reference to a single merchant computing device 180.

Accordingly, merchant computing device 180 may receive the indication, message, or alert indicating that user computing device 170 has been or may be associated with fraudulent purchasing activity and/or, where applicable, the risk factor, and, based upon the indication and/or risk factor, merchant computing device 180 may determine whether to process a resale transaction received from or initiated by user computing device 170. As described herein, such a resale transaction may include an attempt or request to resell goods obtained as a result of the first payment transaction (and/or as a result of any other transaction).

For example, merchant computing device 180 may receive a request from user computing device 170 to post or advertise goods for sale via a website associated with merchant computing device 180. For simplicity, and as described above, such a request may be referred to herein as a "resale transaction." In response to the real transaction, merchant computing device 180 may, as described above, utilize device data associated with user computing device 170 to uniquely identify user computing device 170. Having identified user computing device 170, merchant computing device 180 may communicate with database 120 to retrieve any flag, risk factor, or alert stored in database 120 for user computing device 170. If a flag, risk factor, or alert is stored in association with user computing device 170, merchant computing device 180 may refuse or deny the resale transaction and/or, in some embodiments, merchant computing system 180 may analyze or evaluate the risk factor (or a risk score included in the risk factor) associated with user computing device 170 to determine whether to refuse or deny the resale transaction (step 612).

For example, if the risk score stored in association with user computing device 170 is greater than a threshold value, merchant computing device 180 may refuse or deny the resale transaction, such that the user is not allowed to offer or advertise the goods for sale. On the other hand, if the risk score stored in association with user computing device 170 is less than a threshold value, merchant computing device 180 may process the resale transaction, such that the user is allowed to offer or advertise the goods for sale in association with the resale transaction.

Thus, merchant computing device 180 may determine that a particular user computing device 170 is, or may be, associated with fraudulent or unauthorized purchasing activity. In response to such a determination, merchant computing device 180 may prevent the user from advertising goods for sale via the merchant reseller's website, including, in some cases, the goods purchased in connection with the first payment transaction (e.g., where merchant computing device 180 receives an indication that user computing device 170 is associated with potentially fraudulent activity prior to an attempt at resale of the goods). In other embodiments, merchant computing device 180 may restrict or prevent login to an account, such as an account provided by the merchant reseller. Further still, in some embodiments, merchant computing device 180 may prevent account registration and/or provide the device data associated with user computing device 170 to law enforcement and/or any other system or party for further investigation In addition, in the example, embodiment, fraud detection computing device 150 may update a risk score associated with user computing device 170 based upon a plurality of payment transactions initiated from user computing device 170. More particularly, fraud detection computing device 150 may increase a risk score associated with user computing device 170 in response to a plurality of indications of fraudulent or unauthorized purchasing activity initiated from user computing device 170. On the other hand, however, fraud detection computing device 150 may decrease a risk factor associated with user computing device 170 in response to an indication that a payment transaction initiated from user computing device 170 was authorized or not fraudulent. Further, in some embodiments, fraud detection computing device 150 may decrease a risk factor after a period of time has elapsed, provided no indication of fraud or unauthorized purchasing activity is received in connection with user computing device 170.

Figure 7:
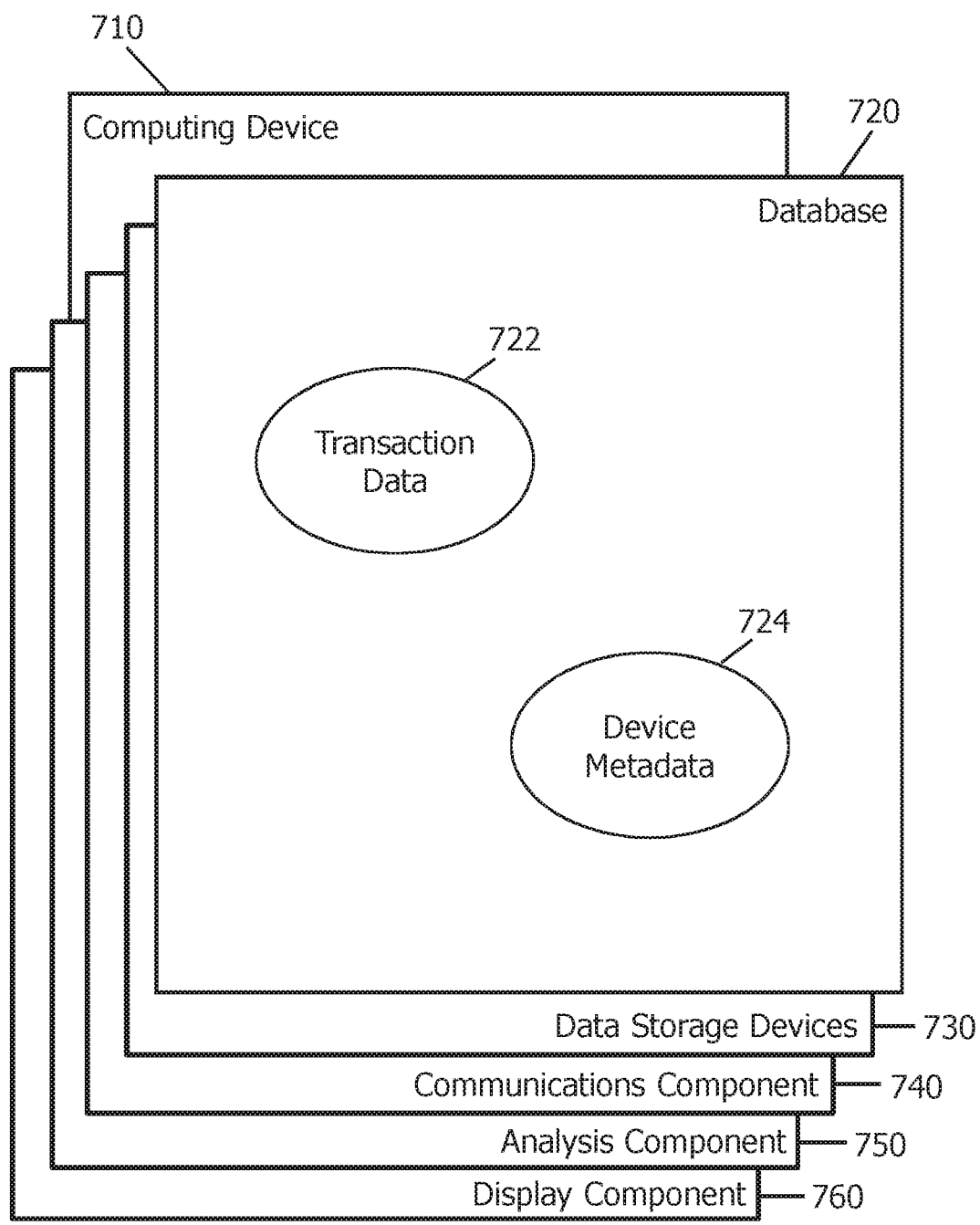

FIG. 7 shows an example configuration of a database 720 within a computing device 710, along with other related computing components, that may be used to identify devices used in fraudulent or unauthorized payment and/or resale transactions, as described herein. In some embodiments, computing device 710 is similar to server system 112 (shown in FIG. 2). In some embodiments, database 720 is similar to database 120 (shown in FIG. 2). In the example embodiment, database 720 includes device data, such as transaction data 722 and device metadata 724. Transaction data 722 and device metadata 724 are described above.

Computing device 710 also includes data storage devices 730. Computing device 710 also includes communications component 740 that may perform, for example, the receiving the device data 602 and/or storing the device data 604 described with respect to FIG. 6. Further, computing device 710 also includes an analysis component 750 that may perform the assigning a risk factor 608 to the device described in FIG. 6. In addition, computing device 710 also includes a display component 760 that may perform a display function, such as display the risk factor and/or displaying another indication, such as an alert, that a user device (such as user computing device 170) may be associated with fraudulent purchasing activity and/or unauthorized purchasing activity.

As will be appreciated based on the foregoing specification, the above-described embodiments of the disclosure may be implemented using computer programming or engineering techniques including computer software, firmware, hardware or any combination or subset thereof, wherein the technical effect is to identify a device used in a fraudulent transaction, such as to fraudulently acquire goods, as well as to prevent future or consecutive fraudulent or unauthorized purchasing activity from the device. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-based method for identifying a user computing device used in a fraudulent transaction, said method performed using a fraud detection computing device comprising at least one processor in communication with at least one memory device, said method comprising:

receiving, by the fraud detection computing device from a first merchant computing device hosting an online sales environment, transaction data and device data, the transaction data including a payment account identifier associated with a payment account, the device data including a unique device identifier associated with the user computing device, the unique device identifier comprising at least one of a MAC address, an IP address, and an IP prefix, the device data and the transaction data acquired by the first merchant computing device in association with a first payment transaction initiated with a first merchant in the online sales environment by the user computing device, the device data capable of uniquely identifying the user computing device, and the payment account identifier used in the first payment transaction;

storing, by the fraud detection computing device, the payment account identifier, the first payment transaction, and the device data in a database structure within the at least one memory device, the database structure including the payment account identifier as the primary key;

subsequent to completion of processing the first payment transaction, receiving, by the fraud detection computing device from a legitimate cardholder of the payment account, an indication that the first payment transaction initiated from the user computing device was fraudulent;

in response to receiving the indication, retrieving, by the fraud detection computing device searching the database structure on the payment account identifier associated with the received indication, the device data associated with the user computing device used to initiate the first payment transaction;

in response to identifying the device data associated with the user computing device, flagging, by the fraud detection computing device, the user computing device associated with the retrieved device data as associated with fraudulent activity; and pushing in real-time an alert including the device data to a second merchant computing device associated with an online resale merchant different from the first merchant, wherein the alert is pushed absent any communication from the online resale merchant regarding a resale transaction including a resale of goods acquired in association with the first payment transaction, wherein the alert causes the second merchant computing device to prevent the user computing device from posting or advertising goods for sale via the online resale merchant, and wherein the alert further causes the second merchant computing device to restrict or prevent login to an existing account established at the online resale merchant and associated with the user computing device.

2. The method of claim 1, further comprising:
analyzing the device data;
uniquely identifying the user computing device based upon the analyzing; and
storing the device data in association with the uniquely identified user computing device.

3. The method of claim 1, wherein the device data further includes at least one of: an event type associated with the first payment transaction, a client name associated with the first payment transaction, a transaction amount associated with the first payment transaction, a transaction currency code associated with the first payment transaction, a transaction date associated with the first payment transaction, a transaction time associated with the first payment transaction, a HTTP header associated with the first payment transaction, an email address associated with the first payment transaction, a shipping address associated with the first payment transaction, a shipping city associated with the first payment transaction, a shipping state associated with the first payment transaction, a shipping country associated with the first payment transaction, a shipping postal code associated with the first payment transaction, a billing address associated with the first payment transaction, a billing city associated with the first payment transaction, a billing state associated with the first payment transaction, a billing country associated with the first payment transaction, a billing postal code associated with the first payment transaction, a user account identifier associated with the first payment transaction, a telephone number associated with the first payment transaction, a telephone country associated with the first payment transaction, a telephone area code associated with the first payment transaction, a primary account number (PAN) associated with the first payment transaction, a PAN expiration date associated with the first payment transaction, a login authentication method associated with the first payment transaction, a card verification status associated with the first payment transaction, a notification outcome associated with the first payment transaction, a merchant identifier associated with the first payment transaction, an acquirer identifier, a stock keeping unit (SKU) category associated with the first payment transaction, an application message type associated with the first payment transaction, a wallet distributor associated with the first payment transaction, and a wallet issuer associated with the first payment transaction.

4. The method of claim 1, wherein the receiving the indication that the first payment transaction was fraudulent comprises receiving a communication from the legitimate cardholder of the payment account used to process the first payment transaction, the communication indicating that the first payment transaction was not authorized by the legitimate cardholder of the payment account.

5. The method of claim 1, further comprising receiving a subsequent indication that a second payment transaction initiated from the user computing device was fraudulent.

6. The method of claim 5, further comprising increasing a risk factor in response to the subsequent indication that the second payment transaction initiated from the user computing device was fraudulent, wherein the step of flagging the user computing device associated with the retrieved device data is performed further in response to the increased risk factor.

7. A fraud detection computing device comprising at least one processor in communication with at least one memory device, said fraud detection computing device configured to:
receive, from a first merchant computing device hosting an online sales environment, transaction data and device data, the transaction data including a payment account identifier associated with a payment account, the device data including a unique device identifier associated with a user computing device, the unique device identifier comprising at least one of a MAC address, an IP address, and an IP prefix, the device data and the transaction data acquired by the first merchant computing device in association with a first payment transaction initiated with a first merchant in the online sales environment by the user computing device, the device data capable of uniquely identifying the user computing device, and the payment account identifier used in the first payment transaction;
store the payment account identifier, the first payment transaction, and the device data in a database structure within the at least one memory device, the database structure including the payment account identifier as the primary key;
subsequent to completion of processing the first payment transaction, receive, from a legitimate cardholder of the payment account, an indication that the first payment transaction initiated from the user computing device was fraudulent;

in response to receiving the indication, retrieve by searching the database structure on the payment account identifier associated with the received indication, the device data associated with the user computing device used to initiate the first payment transaction;

in response to identifying the device data associated with the user computing device, flag the user computing device associated with the retrieved device data as associated with fraudulent activity; and push in real-time an alert including the device data to a second merchant computing device associated with an online resale merchant different from the first merchant, wherein the alert is pushed absent any communication from the online resale merchant regarding a resale transaction including a resale of goods acquired in association with the first payment transaction, wherein the alert causes the second merchant computing device to prevent the user computing device from posting or advertising goods for sale via the online resale merchant, and wherein the alert further causes the second merchant computing device to prevent registration of an account at the online resale merchant by the user computing device.

8. The fraud detection computing device of claim 7, wherein said fraud detection computing device is further configured to:

analyze the device data;

uniquely identify the user computing device based upon the analyzing; and store the device data in association with the uniquely identified user computing device.

9. A fraud detection computing device comprising at least one processor in communication with at least one memory device, said fraud detection computing device configured to:

receive, from a first merchant computing device hosting an online sales environment, transaction data and device data, the transaction data including a payment account identifier associated with a payment account, the device data including a unique device identifier associated with a user computing device, the unique device identifier comprising at least one of a MAC address, an IP address, and an IP prefix, the device data and the transaction data acquired by the first merchant computing device in association with a first payment transaction initiated with a first merchant in the online sales environment by the user computing device, the device data capable of uniquely identifying the user computing device, and the payment account identifier used in the first payment transaction;

store the payment account identifier, the first payment transaction, and the device data in a database structure within the at least one memory device, the database structure including the payment account identifier as the primary key;

subsequent to completion of processing the first payment transaction, receive, from a legitimate cardholder of the payment account, an indication that the first payment transaction initiated from the user computing device was fraudulent;

in response to receiving the indication, retrieve by searching the database structure on the payment account identifier associated with the received indication, the device data associated with the user computing device used to initiate the first payment transaction;

in response to identifying the device data associated with the user computing device, flag the user computing device associated with the retrieved device data as associated with fraudulent activity; and push in real-time an alert including the device data to a second merchant computing device associated with an online resale merchant different from the first merchant, wherein the alert is pushed absent any communication from the online resale merchant regarding a resale transaction including a resale of goods acquired in association with the first payment transaction, wherein the alert causes the second merchant computing device to prevent the user computing device from posting or advertising goods for sale via the online resale merchant, and wherein the alert further causes the second merchant computing device to restrict or prevent login to an existing account established at the online resale merchant and associated with the user computing device.

10. The fraud detection computing device of claim 9, wherein said fraud detection computing device is further configured to:

analyze the device data;

uniquely identify the user computing device based upon the analyzing; and store the device data in association with the uniquely identified user computing device.

11. The fraud detection computing device of claim 9, wherein the device data further includes at least one of: an event type associated with the first payment transaction, a client name associated with the first payment transaction, a transaction amount associated with the first payment transaction, a transaction currency code associated with the first payment transaction, a transaction date associated with the first payment transaction, a transaction time associated with the first payment transaction, a HTTP header associated with the first payment transaction, an email address associated with the first payment transaction, a shipping address associated with the first payment transaction, a shipping city associated with the first payment transaction, a shipping state associated with the first payment transaction, a shipping country associated with the first payment transaction, a shipping postal code associated with the first payment transaction, a billing address associated with the first payment transaction, a billing city associated with the first payment transaction, a billing state associated with the first payment transaction, a billing country associated with the first payment transaction, a billing postal code associated with the first payment transaction, a user account identifier associated with the first payment transaction, a telephone number associated with the first payment transaction, a telephone country associated with the first payment transaction, a telephone area code associated with the first payment transaction, a primary account number (PAN) associated with the first payment transaction, a PAN expiration date associated with the first payment transaction, a login authentication method associated with the first payment transaction, a card verification status associated with the first payment transaction, a notification outcome associated with the first payment transaction, a merchant identifier associated with the first payment transaction, an acquirer identifier, a stock keeping unit (SKU) category associated with the first payment transaction, an application message type associated with the first payment transaction, a wallet distributor associated with the first payment transaction, and a wallet issuer associated with the first payment transaction.

12. The fraud detection computing device of claim 9, wherein said fraud detection computing device is further configured to receive a communication from the legitimate cardholder of the payment account used to process the first payment transaction, the communication indicating that the first payment transaction was not authorized by the legitimate cardholder of the payment account.

13. The fraud detection computing device of claim 9, wherein said fraud detection computing device is further configured to receive a subsequent indication that a second payment transaction initiated from the user computing device was fraudulent.

14. The fraud detection computing device of claim 13, wherein said fraud detection computing device is further configured to increase a risk factor in response to the subsequent indication that the second payment transaction initiated from the user computing device was fraudulent, and wherein the step of flagging the user computing device associated with the retrieved device data is performed further in response to the increased risk factor.

15. The fraud detection computing device of claim 7, wherein the device data further includes at least one of: an event type associated with the first payment transaction, a client name associated with the first payment transaction, a transaction amount associated with the first payment transaction, a transaction currency code associated with the first payment transaction, a transaction date associated with the first payment transaction, a transaction time associated with the first payment transaction, a HTTP header associated with the first payment transaction, an email address associated with the first payment transaction, a shipping address associated with the first payment transaction, a shipping city associated with the first payment transaction, a shipping state associated with the first payment transaction, a shipping country associated with the first payment transaction, a shipping postal code associated with the first payment transaction, a billing address associated with the first payment transaction, a billing city associated with the first payment transaction, a billing state associated with the first payment transaction, a billing country associated with the first payment transaction, a billing postal code associated with the first payment transaction, a user account identifier associated with the first payment transaction, a telephone number associated with the first payment transaction, a telephone country associated with the first payment transaction, a telephone area code associated with the first payment transaction, a primary account number (PAN) associated with the first payment transaction, a PAN expiration date associated with the first payment transaction, a login authentication method associated with the first payment transaction, a card verification status associated with the first payment transaction, a notification outcome associated with the first payment transaction, a merchant identifier associated with the first payment transaction, an acquirer identifier, a stock keeping unit (SKU) category associated with the first payment transaction, an application message type associated with the first payment transaction, a wallet distributor associated with the first payment transaction, and a wallet issuer associated with the first payment transaction.

16. The fraud detection computing device of claim 7, wherein said fraud detection computing device is further configured to receive a communication from the legitimate cardholder of the payment account used to process the first payment transaction, the communication indicating that the first payment transaction was not authorized by the legitimate cardholder of the payment account.

17. A non-transitory computer readable medium that includes computer executable instructions for identifying a user computing device used in a fraudulent transaction, wherein when executed by a fraud detection computing device comprising at least one processor in communication with at least one memory device, the computer executable instructions cause the fraud detection computing device to:
  receive, from a first merchant computing device hosting an online sales environment, transaction data and device data, the transaction data including a payment account identifier associated with a payment account, the device data including a unique device identifier associated with the user computing device, the unique device identifier comprising at least one of a MAC address, an IP address, and an IP prefix, the device data and the transaction data acquired by the first merchant computing device in association with a first payment transaction initiated with a first merchant in the online sales environment by the user computing device, the device data capable of uniquely identifying the user computing device, and the payment account identifier used in the first payment transaction;
  store the payment account identifier, the first payment transaction, and the device data in a database structure within the at least one memory device, the database structure including the payment account identifier as the primary key;
  subsequent to completion of processing the first payment transaction, receive, from a legitimate cardholder of the payment account, an indication that the first payment transaction initiated from the user computing device was fraudulent;
  in response to receiving the indication, retrieve, by searching the database structure on the payment account identifier associated with the received indication, the device data associated with the user computing device used to initiate the first payment transaction;
  in response to identifying the device data associated with the user computing device, flag the user computing device associated with the retrieved device data as associated with fraudulent activity; and
  push in real-time an alert including the device data to a second merchant computing device associated with an online resale merchant different from the first merchant, wherein the alert is pushed absent any communication from the online resale merchant regarding a resale transaction including a resale of goods acquired in association with the first payment transaction, wherein the alert causes the second merchant computing device to prevent the user computing device from posting or advertising goods for sale via the online resale merchant, and wherein the alert further causes the second merchant computing device to restrict or prevent login to an existing account established at the online resale merchant and associated with the user computing device.

18. The fraud detection computing device of claim 7, wherein said fraud detection computing device is further configured to receive a subsequent indication that a second payment transaction initiated from the user computing device was fraudulent.

19. The fraud detection computing device of claim 18, wherein said fraud detection computing device is further configured to increase a risk factor in response to the subsequent indication that the second payment transaction initiated from the user computing device was fraudulent, and wherein the step of flagging the user computing device associated with the retrieved device data is performed further in response to the increased risk factor.

20. A computer-based method for identifying a user computing device used in a fraudulent transaction, said method performed using a fraud detection computing device comprising at least one processor in communication with at least one memory device, said method comprising:

receiving, by the fraud detection computing device from a first merchant computing device hosting an online sales environment, transaction data and device data, the transaction data including a payment account identifier associated with a payment account, the device data including a unique device identifier associated with the user computing device, the unique device identifier comprising at least one of a MAC address, an IP address, and an IP prefix, the device data and the transaction data acquired by the first merchant computing device in association with a first payment transaction initiated with a first merchant in the online sales environment by the user computing device, the device data capable of uniquely identifying the user computing device, and the payment account identifier used in the first payment transaction;

storing, by the fraud detection computing device, the payment account identifier, the first payment transaction, and the device data in a database structure within the at least one memory device, the database structure including the payment account identifier as the primary key;

subsequent to completion of processing the first payment transaction, receiving, by the fraud detection computing device from a legitimate cardholder of the payment account, an indication that the first payment transaction initiated from the user computing device was fraudulent;

in response to receiving the indication, retrieving, by the fraud detection computing device searching the database structure on the payment account identifier associated with the received indication, the device data associated with the user computing device used to initiate the first payment transaction;

in response to identifying the device data associated with the user computing device, flagging, by the fraud detection computing device, the user computing device associated with the retrieved device data as associated with fraudulent activity; and pushing in real-time an alert including the device data to a second merchant computing device associated with an online resale merchant different from the first merchant, wherein the alert is pushed absent any communication from the online resale merchant regarding a resale transaction including a resale of goods acquired in association with the first payment transaction, wherein the alert causes the second merchant computing device to prevent the user computing device from posting or advertising goods for sale via the online resale merchant, and wherein the alert further causes the second merchant computing device to prevent registration of an account at the online resale merchant by the user computing device.

21. The method of claim 20, further comprising:
analyzing the device data;
uniquely identifying the user computing device based upon the analyzing; and
storing the device data in association with the uniquely identified user computing device.

22. The method of claim 20, wherein the device data further includes at least one of: an event type associated with the first payment transaction, a client name associated with the first payment transaction, a transaction amount associated with the first payment transaction, a transaction currency code associated with the first payment transaction, a transaction date associated with the first payment transaction, a transaction time associated with the first payment transaction, a HTTP header associated with the first payment transaction, an email address associated with the first payment transaction, a shipping address associated with the first payment transaction, a shipping city associated with the first payment transaction, a shipping state associated with the first payment transaction, a shipping country associated with the first payment transaction, a shipping postal code associated with the first payment transaction, a billing address associated with the first payment transaction, a billing city associated with the first payment transaction, a billing state associated with the first payment transaction, a billing country associated with the first payment transaction, a billing postal code associated with the first payment transaction, a user account identifier associated with the first payment transaction, a telephone number associated with the first payment transaction, a telephone country associated with the first payment transaction, a telephone area code associated with the first payment transaction, a primary account number (PAN) associated with the first payment transaction, a PAN expiration date associated with the first payment transaction, a login authentication method associated with the first payment transaction, a card verification status associated with the first payment transaction, a notification outcome associated with the first payment transaction, a merchant identifier associated with the first payment transaction, an acquirer identifier, a stock keeping unit (SKU) category associated with the first payment transaction, an application message type associated with the first payment transaction, a wallet distributor associated with the first payment transaction, and a wallet issuer associated with the first payment transaction.

23. The method of claim 20, wherein the receiving the indication that the first payment transaction was fraudulent comprises receiving a communication from the legitimate cardholder of the payment account used to process the first payment transaction, the communication indicating that the first payment transaction was not authorized by the legitimate cardholder of the payment account.

24. The method of claim 20, further comprising receiving a subsequent indication that a second payment transaction initiated from the user computing device was fraudulent.

25. The method of claim 24, further comprising increasing a risk factor in response to the subsequent indication that the second payment transaction initiated from the user computing device was fraudulent, wherein the step of flagging the user computing device associated with the retrieved device data is performed further in response to the increased risk factor.

* * * * *